(12) United States Patent
Langeslag et al.

(10) Patent No.: US 10,090,770 B2
(45) Date of Patent: Oct. 2, 2018

(54) ISOLATED POWER CONVERTER WITH OUTPUT VOLTAGE PROTECTION

(71) Applicant: NXP B.V., Eindhoven (NL)

(72) Inventors: Wilhelmus Hinderikus Maria Langeslag, Wijchen (NL); Jeroen Kleinpenning, Lent (NL)

(73) Assignee: NXP B.V., Eindhoven (NL)

( * ) Notice: Subject to any disclaimer, the term of this patent is extended or adjusted under 35 U.S.C. 154(b) by 19 days.

(21) Appl. No.: 15/184,432

(22) Filed: Jun. 16, 2016

(65) Prior Publication Data

US 2017/0366091 A1  Dec. 21, 2017

(51) Int. Cl.
*H02M 3/335* (2006.01)
*H02M 1/08* (2006.01)
*H02M 1/32* (2007.01)
*H02M 1/00* (2006.01)

(52) U.S. Cl.
CPC ......... *H02M 3/33523* (2013.01); *H02M 1/08* (2013.01); *H02M 1/32* (2013.01); *H02M 2001/0032* (2013.01); *Y02B 70/16* (2013.01)

(58) Field of Classification Search
CPC ...... H02M 3/33523; H02M 1/08; H02M 1/32; H02M 2001/325
See application file for complete search history.

(56) References Cited

U.S. PATENT DOCUMENTS

| | | | | |
|---|---|---|---|---|
| 5,708,551 A | * | 1/1998 | Bosatelli | H01R 13/641 307/38 |
| 5,822,200 A | * | 10/1998 | Stasz | H02M 3/33507 323/906 |
| 5,841,313 A | | 11/1998 | Levin et al. | |
| 2005/0180178 A1 | * | 8/2005 | Yang | H02M 3/33569 363/21.06 |
| 2011/0210620 A1 | * | 9/2011 | Shinoda | H02J 5/005 307/104 |
| 2014/0160802 A1 | * | 6/2014 | Zhang | H02M 3/335 363/21.01 |
| 2014/0169046 A1 | | 6/2014 | Chen | |
| 2015/0043248 A1 | | 2/2015 | Hsiao et al. | |
| 2015/0212566 A1 | | 7/2015 | Bodnar et al. | |
| 2015/0326008 A1 | * | 11/2015 | Baurle | H02H 1/0084 361/87 |
| 2016/0087422 A1 | | 3/2016 | Mourrier et al. | |
| 2016/0172840 A1 | * | 6/2016 | Luebke | H02H 3/207 361/111 |
| 2016/0308452 A1 | * | 10/2016 | Motoki | H02M 3/33523 |
| 2017/0040820 A1 | * | 2/2017 | Ono | H02J 7/0052 |

\* cited by examiner

*Primary Examiner* — Adolf Berhane
*Assistant Examiner* — Bart Iliya (57) ABSTRACT

An apparatus for delivering power to a load, which comprises an isolated power converter that converts input power on a primary side to output power and a supply voltage at a node on a secondary side. On the secondary side, a load switch is located on a current path to the load. A secondary-side control circuitry controls the load switch to operate in an ON mode in which current is provided to the load, and in response to a fault condition corresponding to an effective sudden disconnection of the supply voltage, switches the load switch into an OFF mode in which the current path to the load is blocked.

20 Claims, 6 Drawing Sheets

ISOLATED POWER CONVERTER WITH OUTPUT VOLTAGE PROTECTION

Aspects of the instant disclosure are directed to isolated power conversion circuits (e.g., isolated power converters such as flyback converters) in which AC/DC power is converted across a galvanic isolation to DC power.

In various instances, the demand for an amount of power being delivered to circuitry by a converter is increasing. For example, a mobile phone has consumer demands for faster charging. A high voltage can be used to deliver fast charging for a battery. The voltage delivered to the circuitry must also be compatible for the converter, such as the charger of the mobile phone. Many chargers operate starting at 5 volts (V) and negotiate the voltage to a higher voltage, e.g., 9, 12, or 20V. Different standards are used to negotiate the voltages, such as Universal Serial Bus Power Delivery (USB-PD), and/or Quick Charge, among other standards. When a fault condition occurs, the connected circuitry needs to be protected.

These and other matters have presented challenges to efficiencies of converters and voltage protection implementations, for a variety of applications.

SUMMARY

Various example embodiments are directed to issues such as those addressed above and/or others which may become apparent from the following disclosure concerning isolated power converters and output voltage protection for load circuitry that is powered by such converters.

In certain example embodiments, aspects of the present disclosure involve a load switch on the secondary side of the isolated power converter and, in response to a disconnect of supply to the secondary-side control circuitry, using the load switch to block a current path to the load.

In a more specific example embodiment, an apparatus delivers power to a load having circuitry that draws power from the apparatus. The apparatus comprises an isolated power converter that responds to input power on a primary side of the isolated power converter by providing a supply voltage at a node on a secondary side of the isolated power converter. The primary side includes primary-side control circuitry that limits an extent to which the isolated power converter is capable of supplying power for providing the supply voltage. The primary-side control circuitry can limit the supply power when a secondary side powered by a supply voltage is present and disconnected from the supply voltage. In various specific aspects, the power is limited by the control loop, but in the case of a sudden disconnect from the supply voltage, the load switch is opened. When the control loop (e.g., opto feedback) does not work well due to the disconnect from supply voltage, the primary side can trigger an over-voltage protection (e.g., primary over-voltage protection) and thereby limit power. The secondary side includes a load switch, a secondary-side control circuitry, and circuitry that draws power when the supply voltage is present. The load switch is arranged along a current path between the node and the load. The secondary-side control circuitry receives the supply voltage (e.g., Vcc) and controls the load switch. For example, the secondary-side control circuitry controls the load switch to operate in an ON mode in which the current path is used to provide current to the load. In response to a fault condition corresponding to an effective sudden disconnection of the supply voltage, the secondary-side control circuitry switches the load switch into an OFF mode in which the current path to the load is blocked (e.g., using an additional supply voltage on the secondary side).

In various specific embodiments, circuitry on the secondary side draws power from the supply voltage when present (such as during an ON mode and/or OFF mode of the load switch). The drawn power is used as an additional supply voltage (e.g., an extra voltage source that is charged during the ON mode and/or OFF mode that is available for use at any time and is used when the supply voltage is disconnected) in response to the sudden disconnect from the supply voltage to cause the load switch to operate in an OFF mode. Further, the load switch operating in the OFF mode during the sudden disconnect from the supply voltage causes the primary-side control circuitry to limit an extent to which the isolated power converter is capable of supplying power in response to the fault condition and using the drawn power. For example, the supply voltage on the secondary side (e.g., at a node prior to the load switch) increases until the primary-side control circuitry triggers a primary over-voltage protection.

In various related embodiments, the circuitry is used to provide feedback to the primary side to control the supply voltage on the secondary side when the supply voltage is connected at the secondary-side control circuitry, such as during basic power control (as described further herein) or in response to fault conditions. For example, the circuitry triggers a signal (e.g., a communication of a voltage measurement of the Vcc voltage) which is provided to the primary-side control circuitry as feedback. The primary-side control circuitry responds to the signal by limiting (or increasing) the supply power. As a specific example, the load asks for power and then because of a fault condition, the load switch is switched to operate in an OFF mode (e.g., the load switch is opened). Initially the supply voltage (Vcc voltage) rises, which is detected by the voltage measurement of the Vcc voltage (e.g., by a resistance divider circuitry) on the secondary-side control circuitry. This is communicated to the primary side by the circuitry and as result the delivered power is reduced.

In another specific example embodiment, the control circuitry on the primary and secondary sides of the isolated power converters include USB-power-delivery (PD) controller circuits. For example, an apparatus includes an isolated power converter that responds to input power on a primary side of the isolated power converter by providing a supply voltage at a node on a secondary side of the isolated power converter. On the primary side of the isolated power converter, a primary-side control circuitry is used to limit an extent to which the isolated power converter is capable of supplying power for providing the supply voltage. A load switch on the secondary side is located along a current path between the node and the load. Further, on the secondary side of the isolated power converter, the USB-PD controller circuit receives the supply voltage and controls the load switch. The USB-PD controller circuit communicates with the load about voltage and current levels. For example, during normal operations, when the load is changing power modes, the load communicates with the USB-PD controller circuit to change the setpoint of the voltage at the secondary side. The changed setpoint of the voltage is communicated to the primary side by the secondary side, such as by an opto coupler, which results in the output voltage changing to a new value.

The USB-PD controller circuit further controls the load switch to operate in an ON mode in which the current path is used to provide current to the load. In response to a fault condition of the supply voltage corresponding (as well as other fault condition such as an over load condition, an over temperature condition) to an effective sudden disconnection, in the form of a short circuit or an open circuit, the USB-PD switches the load switch into an OFF mode in which the current path to the load is blocked. The secondary side of the isolated power converter includes circuitry that draws power during the ON mode of the load switch. In response to the fault condition in which the supply voltage on the USB-PD controller circuit is absent, the circuitry causes the USB-PD controller circuit on the primary side to limit an extent to which the isolated power converter is capable of supplying power.

In other specific example embodiments, the isolated power converter is a multiple output voltage converter (e.g., adapter) that can provide multiple output voltages to the load. For example, the isolated power converter provides the supply voltage as one of multiple voltages that is selected based on feedback from the load to the USB-PD controller circuit on the secondary side, which results in feedback from the secondary side to the primary side. For example, the voltage at an input to the load switch is controlled to a setpoint value. When a fault condition occurs, the load switch is operated in an OFF mode (e.g., the load switch is opened), which results in an increase of supply voltage and which is detected by the secondary-side control circuitry. In various embodiments, the previously described feedback is normal feedback behavior. For example, the load switch being open can result in too much power delivered and which causes Vcc voltage to rise. The feedback loop reduces the power delivered. The circuitry (e.g., an opto coupler) triggers a signal in response to an indication of the fault condition (e.g., fault conditions are measured by the USB-PD controller circuit on the secondary side by monitoring the Vcc voltage, measuring the output current, and measuring the temperature of the load switch, among other measurements) and causes the primary-side control circuitry to limit the extent to which the isolated power converter supplies power regardless of which one of multiple voltages that is selected. When the fault condition corresponds to an effective sudden disconnection of the supply voltage (at the USB-PD controller circuit on the secondary side), the USB-PD controller circuit switches the load switch into an OFF mode using another voltage supply. For example, circuitry on the secondary side (e.g., the opto coupler or the load switch) draws power when the load switch is in an ON mode and/or an OFF mode and the drawn power is used to switch the load switch into an OFF mode in response to the disconnection of supply voltage.

Various method embodiments include responding to input power on a primary side of an isolated power converter by providing a supply voltage at a node on a secondary side of the isolated power converter. The supply voltage being one of multiple voltages that is selected based on feedback from a load to the secondary side, which communicates with the primary-side. For example, the load communicates via a particular protocol to the secondary-side control circuitry. The setpoint of the voltage (as communicated by the load) is compared at the secondary side with the supply voltage. As previously discussed, the supply voltage is received from the primary side at the node and passed along a current path from the node to the load. In response to the presence of the supply voltage at the secondary-side control circuitry, the method includes controlling a load switch to operate in an ON mode in which the first current path is used to provide current to the load. And, in response to a fault condition of the supply voltage corresponding to an effective sudden disconnection, in the form of a short circuit or an open circuit, the method includes switching the load switch into an OFF mode in which the current path to the load is blocked, and thereby causing the primary-side control circuitry to limit an extent to which the isolated power converter is capable of supplying power for providing the supply voltage. For example, because of the open load switch (and no feedback from the secondary side), Vcc voltage on the secondary side rises, and can result in the triggering a primary over-voltage protection (e.g., when no feedback is provided by the feedback loop, the primary over-voltage is triggered). In a specific example, because of the fault condition, the opto coupler cannot be driven, such as when the supply voltage is disconnected at the secondary side, an open in the opto, or other fault condition, and feedback is not provided to the primary side.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving circuitry on a secondary side of an isolated power converter that draws power when a supply voltage from the primary side is present at the secondary side and causes a load switch to operate in an OFF mode using the drawn power in response to the secondary side being suddenly disconnected from the supply voltage. In certain implementations, aspects of the present disclosure have been shown to be beneficial when used in the context of a charger configured to deliver power to a load (e.g., cell phone) having circuitry which limits an output voltage delivered to the load in response to a secondary side of the charger disconnecting from a supply voltage from the primary side of the charger. In some embodiments, circuitry (e.g., an opto coupler) on the secondary side draws power and the secondary-side control circuitry uses the drawn power when the supply voltage is not present to switch a load switch on the secondary side into an OFF mode and thereby limit an output voltage delivered to the load. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various voltage converters have multiple voltages that can be output by the power converter to a load. A power converter refers to or includes circuitry that delivers power to a load. Example converters include a charger, an adapter, etc. The power converter, in various embodiments, is an isolated power converter that has two isolated circuitry sides. The isolated power converter converts input power on the primary side and provides a supply voltage (Vcc) at a node on the secondary side of the isolated power converter. Generally, the primary side has over-voltage protection. For a single output voltage, the circuitry providing over-voltage protection may protect circuitry of the load from an over-voltage condition.

With a multiple output voltage converter, the internal circuits are supplied via a supply pin and the over-voltage protection on the primary side may not protect the load circuitry. For example, with a multiple output voltage converter, the over-voltage protection at the primary side of the device can trigger above the highest output voltage of the multiple output voltages. Various embodiments in accordance with the present disclosure include limiting the output power when the secondary side of the converter is disconnected from the supply voltage. A load switch is arranged along a current path between the node provided with the supply voltage and the load on the secondary side of the converter. The load switch connects or disconnects the load to the current path, which determines the power output to the load (e.g., voltage or current to the load). For example, during an ON mode of the load switch, current is provided to the load. During an OFF mode, the current to the load is blocked. The secondary-side control circuitry monitors the supply voltage on the secondary side (e.g., a node prior or after the load switch) and in response the supply voltage exceeding the setpoint voltage (e.g., a range of voltages), turns off the load switch (e.g., opens the load switch). When supply voltage is present at the secondary-side control circuitry, a control signal (e.g., power control signal from an opto coupler) is changed and provided to the primary-side control circuitry. In specific embodiments, the control signal includes a power control signal which is changed via an opto coupler. The changed power control signal can be an analog signal that determines the delivered power at the primary side. For example, in response to the load switch operating in the OFF mode, the supply voltage increases which is measured by the secondary-side control circuitry (e.g., the measured supply voltage is compared to the setpoint voltage value by resistor divider circuitry) and triggers a control signal (e.g., changes the power control signal) provided by an opto coupler to the primary side. In response to the control signal, the primary-side control circuitry limits an extent to which the isolated power converter supplies power.

In various embodiments, a fault condition occurs in which the secondary-side control circuitry is disconnected from the supply voltage (Vcc). The secondary side can include another power source to draw power from when the secondary-side control circuitry is disconnected from the supply voltage to protect from over-voltage. Circuitry (e.g., an opto coupler or gate of the load switch) on the secondary side draws power when the load switch is in an ON mode (e.g., and the supply voltage (Vcc) is present). For example, in specific embodiments, the other power source is present independent of when the load switch is on or off (e.g., with an opto voltage of an opto coupler). In other specific embodiments, the other power source is presence when the load switch is operating in the ON mode (e.g., with a gate voltage of the load switch). The secondary side uses the drawn power (e.g. the additional power source) to switch the load switch into an OFF mode in which the current path to the load is blocked. In response to the load switch operating in the OFF mode, the primary-side control circuitry limits an extent to which the isolated power converter supplies power. For example, as further described herein, the primary side triggers a primary over-voltage protection in response to the load switch operating in the OFF mode due to the feedback signal to the primary side being lost (e.g., no supply voltage to drive the opto coupler to provide the changed control signal).

A number of embodiments are directed to an apparatus for delivering power to a load. The load has circuitry (herein generally referred to as load circuitry) that is powered by the power output by the apparatus. The apparatus is an isolated power converter with two isolated sides: a primary side and a secondary side. For example, the apparatus includes a transformer with circuitry on the primary side and the secondary side that transfers power from the primary side to the secondary side through the transformer. The primary side includes a primary-side control circuitry that can limit an extent to which the isolated power converter can supply power for providing a supply voltage. In specific embodiments, the load is a cell phone and the apparatus is a charger.

In various embodiments, the load and its corresponding circuitry are protected from an over-voltage fault condition by the isolated power converter. For example, the primary side includes the primary-side control circuitry to limit converted power used for providing the supply voltage to the secondary side. While the primary-side control circuitry may include over-voltage protection circuitry, a fault condition can occur that corresponds to (e.g., is caused by or is occurring during a fault condition) the secondary side suddenly disconnecting from the supply voltage and in which no feedback is provided to the primary side. As the primary-side control circuitry delivers power to the load without being aware of when the voltage is high enough, the primary side continues to provide power until a primary over-voltage protection is triggered and the isolated power converter stops (e.g., the over-voltage protection is triggered due to no feedback from the secondary side). The primary-side control circuitry provides the over-voltage protection by monitoring secondary-side voltage and triggering a primary over-voltage protection in response to the secondary-side voltage reaching a threshold voltage. However, the primary over-voltage protection may be set to a voltage that can cause damage to the load circuitry. The secondary side, when disconnected from the supply voltage, can limit the power that is output to the load using circuitry that draws power when the supply voltage is present. For example, the secondary-side control circuitry is configured and arranged to control an extent to which the isolated power converter is capable of outputting power by switching the load switch into the OFF mode to limit the output power at a voltage that is lower than the threshold voltage. As the secondary side is powered via the supply voltage, the drawn power (e.g., the additional power source on the secondary side) allows for the secondary side to limit supply power responsive to the sudden disconnect from the supply voltage.

The secondary-side control circuitry receives the supply voltage and in response to a fault condition, limits an extent to which the isolated power converter outputs power using power that was previously drawn when the supply voltage is present. For example, the secondary side includes circuitry that draws the power when the supply voltage is present (such as when a load switch is operating in an ON mode as discussed below and/or in an OFF mode in various embodiments) and the secondary-side control circuitry switches the load switch into an OFF mode using the drawn power in response to a fault condition corresponding to a sudden disconnect from the supply voltage at the secondary-side control circuitry. The circuitry, in various embodiments, includes an opto coupler (e.g., an opto pin) and/or the gate terminal of a load switch.

A load switch can be located on the secondary side along a current path between the node and the load. The load switch is turned on and off to operate in an ON mode and an OFF mode. During the ON mode, current is provided to the load via the current path from the node to the load. In the OFF mode, current is blocked from the load along the current path. In various embodiments, the load switch is turned off when the secondary-side control circuitry is disconnected from the supply voltage. The secondary side includes secondary-side control circuitry and the circuitry that draws the power when the supply voltage is present (e.g., an additional voltage source on the secondary-side that draws power during the ON mode and/or OFF mode). As previously described, in some embodiments, the other power source is present independent of when the load switch is on or off (e.g., with an opto voltage of an opto coupler). In other specific embodiments, the other power source is presence when the load switch is operating in the ON mode (e.g., with a gate voltage of the load switch). The secondary-side control circuitry is used to control the load switch to operate in the ON mode and OFF Mode. In response to a fault condition corresponding to an effective sudden disconnect of the supply voltage at the secondary-side control circuitry, the secondary-side control circuitry switches the load switch into the OFF mode using the drawn power from the circuitry to limit output power provided to the load from the isolated power converter.

Additionally, in various embodiments and in response to a fault condition, the secondary-side control circuitry limits the supply power supplied by the primary side of the isolated power converter. When the supply voltage (Vcc voltage) is present on the secondary-side control circuitry, the secondary-side control circuitry monitors the load switch (e.g., the Vcc voltage, output current, temperature, etc.) for a fault condition and changes current through the circuitry (e.g., an opto coupler) to cause a control signal to be provided to the primary-side control circuitry. Without the presence of supply voltage (Vcc), another voltage source is used to lower the output power by turning off the load switch on the secondary side. As previously described, the circuitry draws power during the ON mode (and/or OFF mode in some embodiments) and uses the drawn power to charge another node (e.g., another voltage source used to force the load switch into the OFF mode). In response to a fault condition corresponding to an effective sudden disconnect of the secondary-side control circuitry from the supply voltage, the drawn power is used by the secondary-side control circuitry to switch the load switch into the OFF mode (e.g., by drawing power from the charged node) and thereby limits the output power (e.g., by limiting voltage or current) provided to the load. And, the primary-side control circuitry, in response (to an increase in supply voltage on the secondary side caused by the load switch being open), limits the supplied power to limit the supply voltage provided to the secondary side (e.g., triggers a primary over-voltage protection due to no feedback provided to the primary side). For example, when supply voltage is present at the secondary side and the load switch is operated in the ON mode, the secondary-side voltage (Vsec voltage) can rise due to the speed of the feedback provided. The secondary-side control circuitry regulates the supply voltage via feedback to the primary side, such as via an opto coupler. However, when no supply voltage is present at the secondary side, no feedback is provided to the primary side, so the secondary-side voltage keeps rising until the primary over-voltage protection is triggered.

In various embodiments, the isolated power converter is a multi-voltage converter, such as an adapter, that can provide a plurality of different output voltages to one or more loads. The primary side of the adapter, due to the multiple output voltages, is not always able to provide over-voltage protection to the circuitry of the load. For example, when a fault condition occurs that corresponds with an error with the connection at the secondary side of the adapter, the primary side is not able to provide the over-voltage protection until a primary over-voltage protection is triggered. The primary side provides the primary over-voltage protection by monitoring a voltage across the transformer via a winding on the transformer. When the voltage gets too high, the primary over-voltage protection is triggered. The primary side does not know the required output voltage and can only protect on the threshold voltage, which may be higher than the load can handle. In such instances, the secondary side is used to provide over-voltage protection by using a voltage on the secondary side that is present when supply voltage from the primary side is disconnected.

As a specific example, a load switch is on the secondary side of the converter located along a current path between a node that is provided with supply voltage from the primary side and the load that is powered by the converter. When the supply voltage on the secondary-side control circuitry is disconnected, another voltage source on the secondary side is present and used to turn off the load switch. The current path to the load is blocked responsive to the load switch being turned off.

The primary-side control circuitry can trigger a primary over-voltage protection. For example, the primary-side control circuitry monitors a voltage across the transformer via an auxiliary winding on the transformer. After the fault condition occurs and the load switch is turned off, the primary side continues to supply power to the secondary side. For example, the primary-side control circuitry continues to provide supply voltage until the primary over-voltage protection is triggered. To protect the load (e.g., cellphone), the secondary-side control circuitry switches the load switch into an OFF mode and, in response (e.g., to a rise in secondary side voltage and no feedback provided), the supply voltage on the secondary side rises till the primary over-voltage protection is triggered.

The circuitry can provide a control signal (e.g., a basic power control signal) indicative of the fault condition to the primary-side control circuitry when the supply voltage is present at the secondary-side control circuitry. The control signal includes or refers to a power control signal that includes a voltage, such as a supply voltage measured. In response to the control signal, the primary-side control circuitry limits and/or stops supplying power to the secondary side. In some embodiments, the circuitry includes an opto coupler. The opto coupler draws a power (e.g., a first voltage) that is used to provide basic power control when the supply voltage is present (e.g., communicates an optical signal to the primary side). The opto coupler is used to draw power (e.g., a second voltage that is used to charge an OPTO pin) when the load switch is in an ON mode, and the drawn power is used to turn the load switch off in response to the fault condition corresponding to the sudden disconnect from supply voltage. In other embodiments, the gate terminal of the load switch draws the additional voltage. In such embodiments, an opto coupler or other circuitry (e.g., pulse transformer) is used to provide the communication (e.g., basic power control or feedback from a fault condition in which supply voltage is present at the secondary-side control circuitry) to the primary side. Although embodiments are not so limited and include a plurality of different types of circuitry to draw the power and provide the communication.

Figure 1A:
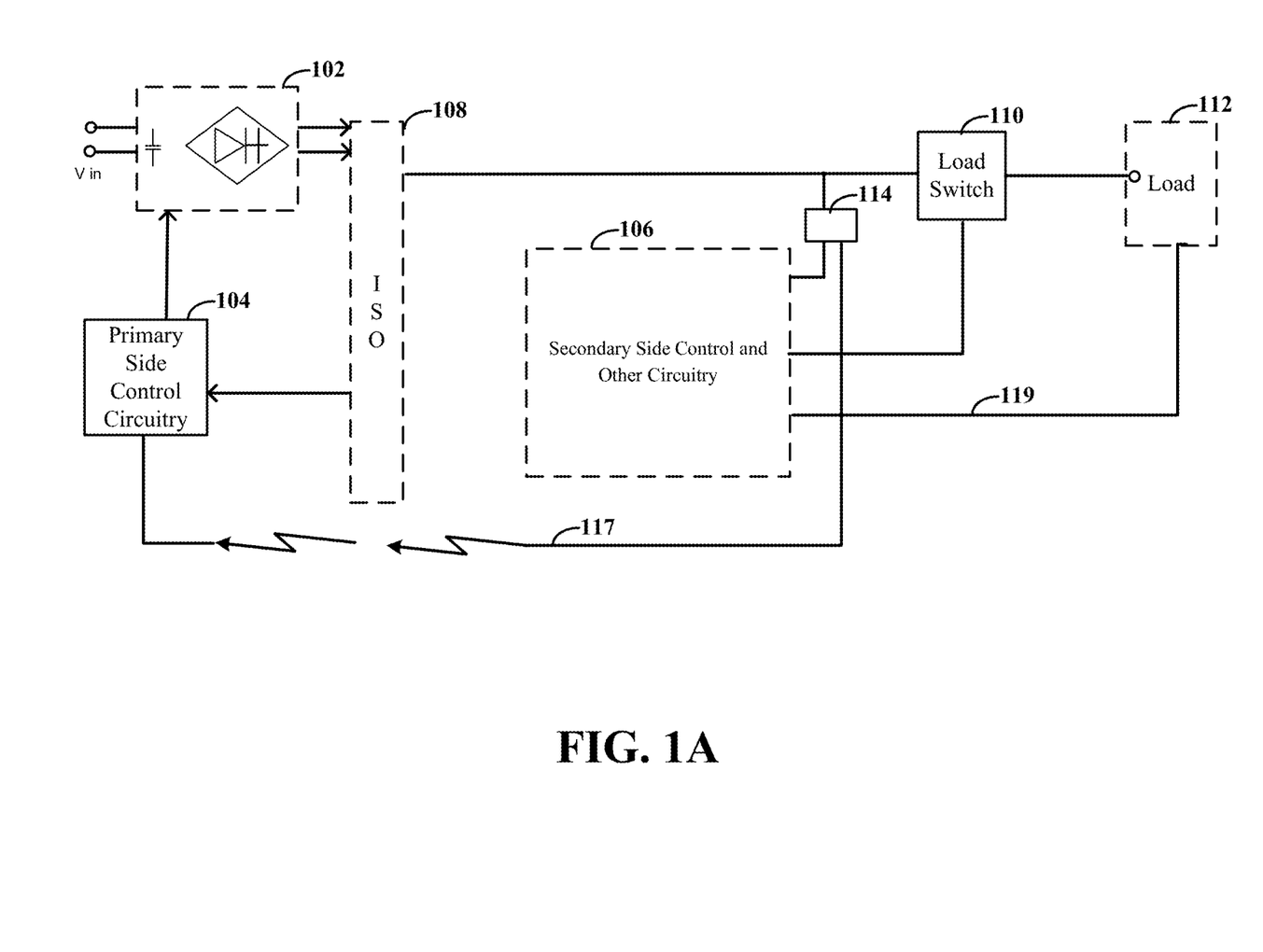
FIG. 1A is an apparatus-level diagram illustrating an example of an isolated power converter, in accordance with the present disclosure.

Turning now to the figures, FIG. 1A is an apparatus-level diagram illustrating an example isolated power converter, in accordance with the present disclosure. The isolated power converter, in various embodiments, is a multiple voltage output adapter. The secondary side of the converter protects the load circuitry from over voltage when the supply power is disconnected. Voltage input to the load switch 110 and/or current output from the load switch 110 (to the load 112) is controlled via feedback 117 from the secondary side of the power converter to the primary side and/or via operation of the load switch 110 in an ON mode and OFF mode. The feedback 117 from the secondary side, in some embodiments, is an optical signal from an opto coupler (which is present on both the primary and secondary side, as further described herein); however, embodiments are not so limited and feedback from the secondary side can be provided by a variety of mechanisms. The load 112 provides feedback 119 to the secondary-side control circuitry 106 to ask for a different setpoint voltage (e.g., a different setting).

As illustrated by FIG. 1A, the isolated power converter includes two sides: a primary side and a secondary side. The primary side provides a supply voltage (Vcc) to the secondary side via induction. For example, the isolated power converter converts input voltage (Vin) to an output voltage and a supply voltage at a node on the secondary side. For example, the input voltage includes alternating current (AC) and/or direct current (DC) from the external source. The external source can include an electrical energy transmission system, an energy stored device (e.g., batteries and/or fuel cells), an electromechanical system (e.g., generator or alternator), a solar power converter, among other power sources. In specific embodiments, the isolated power converter includes a cell phone charger that provides power to the cell phone by converting input power from an electrical outlet (e.g., an electrical plug-in) that is AC to DC. The cell phone draws power from the converted DC and uses the DC output voltage to charge its battery. For example, an AC supply of 220V from the electrical outlet is converted to around 5V of DC output to the cellphone.

Portions of the primary side and portions of the secondary side include isolated power circuitry (ISO) 108. The isolated power circuitry 108 includes a coil on each side of the converter that are used to transfer power from the primary side to the secondary side through electromagnetic coupling.

The primary side includes various circuitry 102 to provide a current to the primary side's winding using the input power. Further, the primary side includes primary-side control circuitry 104. The primary-side control circuitry 104 provides primary over-voltage protection. For example, primary-side control circuitry 104 controls an extent to which the isolated power converter is capable of supplying power, which can be within a time frame that is less than one millisecond (e.g., less than one tenth of a millisecond). In some instances, however, the fault condition occurs at the secondary side. The primary side may be unaware of the required output voltage to the load 112 (e.g., based on the setpoint of the voltage) and a feedback to the secondary side is used to cause the over-voltage protection that occurs in less time than one millisecond (e.g., the load switch 110 is turned off by the secondary-side control circuitry 106 in less time than one millisecond from the fault condition and for protection from over-voltage that is less than the maximum voltage that the primary over-voltage protection protects against). For example, using the secondary side feedback 117, in various embodiments, the primary-side control circuitry 104 controls an extent to which the isolated power converter is capable of supplying power within a time frame that is less a tenth of one millisecond.

The secondary side includes a load switch 110, secondary-side control circuitry 106, and other circuitry. The load switch 110 is located along a current path between a node on the secondary side that is provided with the supply voltage and the load 112. The load 112 has load circuitry that draws power from the isolated power converter. For example, an output voltage is used to power the load circuitry.

The load switch 110 is controlled by the secondary-side control circuitry 106 to determine the power output to the load 112 (e.g., voltage or current to the load 112). The load switch 110 is turned on and off to operate in an ON mode and an OFF mode. During the ON mode, current is provided to the load 112 via the current path from the node to the load 112. In the OFF mode, current is blocked from the load 112 along the current path. In various embodiments, the load switch 110 is turned off when the secondary side is disconnected from the supply voltage. The secondary-side control circuitry 106 receives the supply voltage and controls the load switch 110 to operate in the ON mode and OFF mode. In various embodiments, secondary-side control circuitry 106 controls the load switch 110 to operate in an ON mode in which the current path is used to provide current to the load 112, and in response to a fault condition corresponding to an effective sudden disconnection of the supply voltage, switches the load switch 110 into an OFF mode in which the current path to the load 112 is blocked. The load switch 110 is controlled, in various embodiments, by providing one or more control signals to drive the gate terminal of the load switch 110 high or low.

The secondary-side control circuitry 106, in general, is powered via the supply voltage. When the secondary-side control circuitry 106 is disconnected from the supply voltage, another power source is used to power the secondary-side control circuitry. The circuitry located on the secondary side can draw power from the supply voltage when it is present on the secondary side. In various embodiments, the secondary-side control circuitry 106 is used to control power of the primary side when supply voltage is connected to the secondary-side control circuitry 106. When the supply voltage is not connected, without an additional protection on the secondary side, the power delivery from the primary side continues until primary over-voltage protection is triggered (which is too high of a voltage for some load circuitry). In accordance with embodiments of the present disclosure, when the supply voltage is not connected at the secondary-side control circuitry 106, another voltage source that is present on the secondary side is used to turn the load switch 110 off to provide over-voltage protection.

In various embodiments, the circuitry draws the power when the load switch 110 is operating in an ON mode and/or an OFF mode (or when the supply voltage is otherwise present). The circuitry, in specific embodiments, includes an opto coupler 114 and/or a gate terminal of the load switch 110. In some embodiments, an opto coupler 114 (e.g., the OPTO pin) draws the additional power (e.g., an opto voltage via the OPTO pin) which is present regardless of the mode of the load switch. In other embodiments, when supply voltage is present, the circuitry draws the power to provide an additional secondary-side power. For example, the circuitry drives the gate terminal of the load switch 110 with a gate voltage during the ON mode of the load switch 110. The additional secondary-side power (e.g., the opto voltage or gate voltage) is used in response to a fault condition corresponding to the secondary-side control circuitry 106 being disconnected from the supply voltage. For example, the OPTO pin can draw supply current from the secondary voltage line via the opto diode of the opto coupler 114 and the series resistor and/or the gate of the load switch 234 can deliver charge. Further, the OPTO pin can draw a continuous current, whereas the gate pin of the load switch 110 can supply a temporary current for a period of time. In various embodiments, the circuitry includes logic circuitry to sense a disconnection or short between terminals providing the supply voltage (Vcc) and the load 112.

In response to the fault condition, the load switch 110 is switched into an OFF mode by the secondary-side control circuitry 106 using the power drawn by the circuitry (e.g., the additional voltage source). When the load switch 110 is off and no supply voltage is present to provide the feedback to the primary side, the supply voltage at a node on the secondary side increases (e.g., to the left of the load switch 110 as illustrated by FIG. 1A) and the primary side triggers primary over-voltage protection when the monitored voltage reaches a threshold voltage, which is used to protect the isolated power converted from damage. That is, the load switch 110 being in the OFF mode causes the primary-side control circuitry 104 to limit an extent to which the isolated power converter is capable of supplying power. For example, the circuitry includes an opto coupler 114. The opto coupler 114 operates in an activated state during the ON mode and/or the OFF mode of the load switch 110.

The opto coupler 114 can also be used to provide basic power control and/or feedback to the primary side, when supply voltage (Vcc) is present at the secondary-side control circuitry 106, by providing a control signal (e.g., a basic power control signal) that includes a voltage measurement. When supply voltage is above a threshold value (e.g., the setpoint value), as monitored by the secondary-side control circuitry 106, the opto coupler 114 provides feedback 117 to the primary side. For example, the opto coupler 114 is located on both the primary and the secondary side (as further illustrated by FIG. 2A), and a control signal (in the form of an optical signal) is provided by the opto coupler 114 to the primary-side control circuitry 104 that indicates a voltage measurement of the supply voltage (Vcc). The setpoint voltage can be compared at the secondary side with the supply voltage (Vcc) using resistor divider circuitry. The voltage measurement is supplied as a control signal to the primary-side control circuitry 104 by the secondary-side control circuitry 106 changing a current through the opto coupler 114 to change the control signal (e.g., change the optical signal). When the load 112 is changing the setpoint voltage value, the control signal of the opto coupler 114 changes and is provided to primary-side control circuitry 104 to adjust the power delivery, such that the output power (output current or voltage) is at its intended value. This is an example of a basic power control behavior of the power converter. In response to a fault condition in which supply voltage is connected at the secondary-side control circuitry 106, the secondary-side control circuitry 106 switches the load switch 110 to into an OFF mode and can provide a control signal to the primary side using the same mechanism.

When the supply voltage (Vcc) is effectively disconnected at the secondary-side control circuitry 106, the power control is provided by turning the load switch 110 off using another voltage source (e.g., voltage at the OPTO pin or Gate pin). While in some embodiments, a primary over-voltage protection may be triggered without turning the load switch 110 off, the primary over voltage protection can include a voltage that may damage (e.g., is too high) the connected load 112. Circuitry on the secondary side is used to draw another power source into use in response to the effective disconnect of the supply voltage at the secondary-side control circuitry 106.

The circuitry draws power from another node during the ON mode and in response to the fault condition corresponding to the effective disconnect of supply voltage at the secondary-side control circuitry 106, the drawn power (e.g., the additional voltage supply) is used to switch the load switch 110 into an OFF mode. The other node, in various embodiments, includes a charged node that is charged during the ON mode. For example, the other node (e.g., a charged node) is the gate terminal of the load switch 110 and/or the OPTO pin. The circuitry is coupled to the gate terminal (or the OPTO pin) for drawing power from the charged node for operating in an activated state during the OFF mode and ON mode. The secondary-side control circuitry 106 draws power (e.g., current) from the charged node and uses the drawn power to turn the load switch 110 off when the supply voltage is disconnected at the secondary-side control circuitry 106.

As previously described, the OPTO voltage (e.g., at the OPTO pin) can be used to turn off the load switch 110. In other embodiments, the gate voltage of the load switch 110 is used to turn off the load switch 110. For example, when the basic control is performed differently than with the opto coupler and/or the OPTO voltage is not used, the gate voltage of the load switch 110 can be used. In the ON mode of the load switch 110, the gate voltage is high. In the OFF mode, the gate voltage is low relative to the ON mode. However, as load switch 110 is already in the OFF mode, the gate voltage is not used to turn the load switch 110 off. By contrast, when the load switch 110 is on, the gate voltage can be used to turn the load switch 110 off when supply voltage is disconnected at the secondary-side control circuitry 106.

In specific embodiments, the secondary-side control circuitry 106 cab provide a gate voltage to the gate terminal during the ON mode and in response to the fault condition in which the supply voltage is absent, the secondary-side control circuitry 106 switches the load switch 110 into the OFF mode in using the gate voltage at the load switch 110. For example, the OPTO pin can draw supply current from the secondary voltage line via the opto diode of the opto coupler 114 and the series resistor and/or the gate of the load switch 110 can deliver charge. Further, the OPTO pin can draw a continuous current, whereas the gate pin of the load switch 110 can supply a temporary current for a period of time.

The circuitry can change to an activated state in response to a logic signal indicative of the fault condition and/or a basic power control, and trigger a control signal (e.g., a change in the control signal caused by a change in current from the secondary-side control circuitry). As used herein, the activated state of the circuitry refers to or includes the circuitry providing a control signal or drawing power from a charged node. In some embodiments, the activated state of the circuitry causes/allows for the load switch 110 to turn off (e.g., the drawn power). The load switch operating in the OFF mode can cause the primary-side control circuitry 104 to limit the extent to which the isolated power converter is capable of supplying power by triggering a control signal (e.g., when supply voltage is connected at the secondary-side control circuitry 106). The primary-side control circuitry 104 receives the control signal and, in response, limits the extent to which the isolated power converter is capable of supplying power (e.g., basic power control).

In various embodiments, the primary-side control circuitry 104 additionally includes over-voltage protection circuitry that provides over-voltage protection by stopping supply power provided to the secondary side. For example, the primary-side control circuitry 104 monitors the output voltage via a winding at the transformer. For example, the primary-side control circuitry controls the supply power during both the presence and absence of Vcc on the secondary-side control circuitry. During an over-voltage protection process, the primary-side control circuitry controls an extent to which the isolated power converter is capable of supplying power (e.g., that is less than ¹⁄₁₀ of a millisecond). During the fault condition indicative of a disconnect from the supply voltage (or other fault conditions in which a control signal is provided from the secondary side and supply voltage is connected), the secondary-side control circuitry 106 controls an extent to which the isolated power converter is capable of supplying power within a time frame that is less than a tenth of one millisecond by switching the load switch 110 into an OFF mode.

In various specific embodiments, the isolated power converter is used for USB-PD. For example, the primary-side control circuitry 104 can be part of a USB-PD controller circuit, although embodiments are not so limited as the primary side does not know what the communication protocol is between the load 112 and the secondary-side control circuitry 106 but rather knowns whether to deliver more or less power based on feedback from the secondary side and/or due to triggering of a primary over-voltage protection. In various specific embodiments, when primary over-voltage protection is triggered, no power is delivered at all. In some embodiments, the power converter stalls until the mains is unplugged. In other embodiments, a system restart is performed by the power converter after a period of time. Similarly, the circuitry and/or the secondary-side control circuitry 106 is part of a USB-PD controller circuit. In such embodiments, the circuitry can include the opto coupler 114 configured to operate in an activated state during the ON mode and/or OFF mode and responds to the USB-PD controller circuit on the secondary side. The USB-PD controller circuit, located on the secondary side, controls the opto coupler and thereby triggers the control signal (e.g., the opto coupler is used to control the power by changing a current through the opto coupler). In other embodiments, a communication transformer is used to trigger the control signal and a gate voltage on the load switch 110 is used to turn off the load switch 110 when supply voltage is disconnected from the secondary-side control circuitry 106.

Figure 1B:
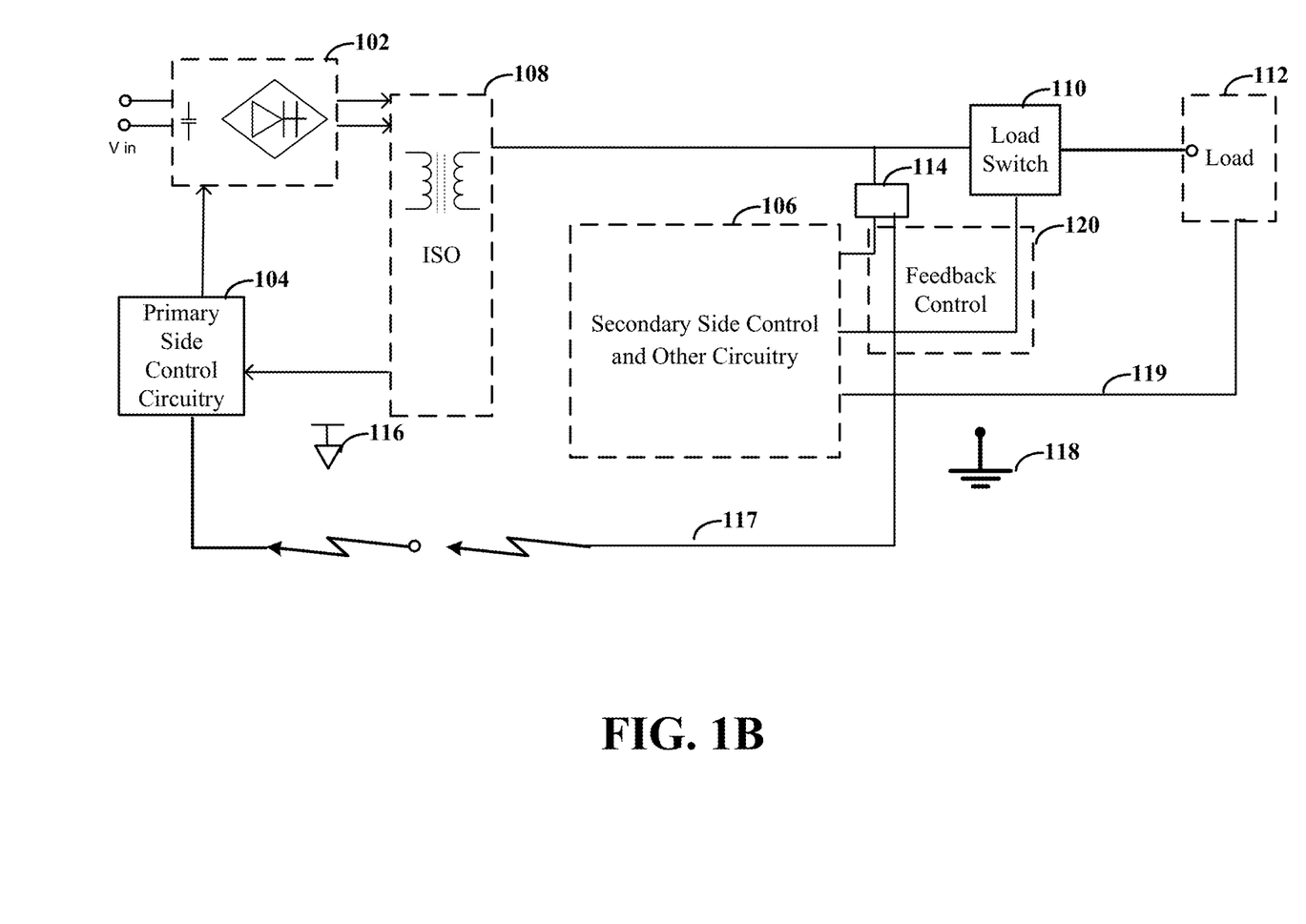
FIG. 1B is an apparatus-level diagram illustrating an example of an isolated power converter, in accordance with the present disclosure.

FIG. 1B is an apparatus-level diagram illustrating an example isolated power converter, in accordance with the present disclosure. In a number of embodiments, the isolated power converter, and the various circuitry therein, illustrated by FIG. 1B include the isolated power converter illustrated and previously discussed in connection with FIG. 1A. To control the output voltage, the load 112 provides feedback 119 to the secondary-side control circuitry 106 to ask for a different setpoint voltage (e.g., a different setting). Voltage input to the load switch 110 and/or current output from the load switch 110 (to the load 112) is controlled via feedback 117 from the secondary side of the converter to the primary side and/or via operation of the load switch 110 in an ON mode and OFF mode. For example, in response to a change in the setpoint voltage and/or a fault condition, feedback 117 is provided via circuitry (e.g., an opto coupler 114) on the secondary side to the primary-side control circuitry. In response to a fault condition, the secondary-side control circuitry 106 turns off the load switch 110 and does not provide feedback to the primary side (e.g., due to the disconnect of supply voltage), which results in the Vcc on the secondary side increasing until a primary over-voltage protection is triggered. In instances in which supply voltage (Vcc) is disconnected at the secondary-side control circuitry 106, another voltage source on the secondary side is used to turn off the load switch 110 (e.g., using an OPTO pin voltage or gate voltage of the load switch 110).

As illustrated by FIG. 1B, the isolated power converter includes two isolated sides, a primary side and a secondary side. Each side has its own ground 116, 118. The primary side provides a supply voltage (Vcc) to the secondary side via electromagnetic coupling. For example, the isolated power converter responds to input power (e.g., input voltage (Vin)) by providing a supply voltage at a node on the secondary side. Portions of the primary side and portions of the secondary side include isolated power circuitry (ISO) 108. The isolated power circuitry 108 includes a coil on each side of the converter that are used to transfer power from the primary side to the secondary side through electromagnetic coupling.

The primary side includes various circuitry 102 to provide a current to the primary side's winding using the input power. Further, the primary side includes primary-side control circuitry 104 that controls an extent to which the isolated power converter is capable of supplying power within a time frame that is greater than one millisecond (e.g., via a primary side-control circuitry) responsive to feedback 117 from the secondary side and the secondary side controls an extent to which the isolated power converter is capable of supplying power.

The secondary side includes a load switch 110, secondary-side control circuitry 106, and other circuitry. The load switch 110 is controlled by the secondary-side control circuitry 106 to operate in the ON mode and the OFF mode. As previously discussed, the load switch 110 is switched into the OFF mode in response to a fault condition corresponding to an effective sudden disconnection of the supply voltage and the circuitry is used to provide feedback 117 to the primary side to control the output power.

The circuitry located on the secondary side can draw power from the supply voltage when it is present on the secondary side. The circuitry, in various embodiments, draws power from an OPTO voltage and/or the gate voltage of the load switch 110 when supply voltage is effectively disconnected from the secondary-side control circuitry 106 and the drawn power is used to turn off the load switch 110. The circuitry can include various feedback control circuitry 120. For example, the circuitry includes an opto coupler (e.g., the opto coupler 114), a transformer (e.g. communication or pulse transformer) and/or a gate terminal of the load switch 110.

In accordance with various embodiments, the isolated power circuitry is a multiple output voltage adapter. For example, the secondary-side control circuitry 106 is part of power-delivery controller circuit that receives a control signal from the load 112. The isolated power converter, via the primary-side control circuitry 104, provides the supply voltage (Vcc) as one of multiple voltages that is selected based on feedback from the load 112 to the power-delivery controller circuit. For example, the opto coupler 114 triggers a signal (e.g., power control signal) and provides feedback 117 to the primary side in response to the control signal (e.g., feedback 119) from the load 112. When a fault condition occurs, the load switch 110 is turned off by the secondary-side to prevent over-voltage damage to the load 112 as the over-voltage protection at the primary-side results in a voltage output that may damage the load 112.

The isolated power converter, in accordance with a number of embodiments, converts input power on a primary side of the isolated power converter to output power and provides secondary-side voltage (Vsec). Circuitry on the secondary side, during the OFF mode and/or when the supply voltage is disconnected, draws current from the secondary-side voltage to provide another source of power on the secondary side. By drawing current from the additional secondary-side voltage, in the absence of supply voltage (Vcc), the secondary-side control circuitry 106 is capable of causing the load switch 110 to turn off when disconnected from the supply voltage (e.g., the secondary-side voltage).

Figure 2A:
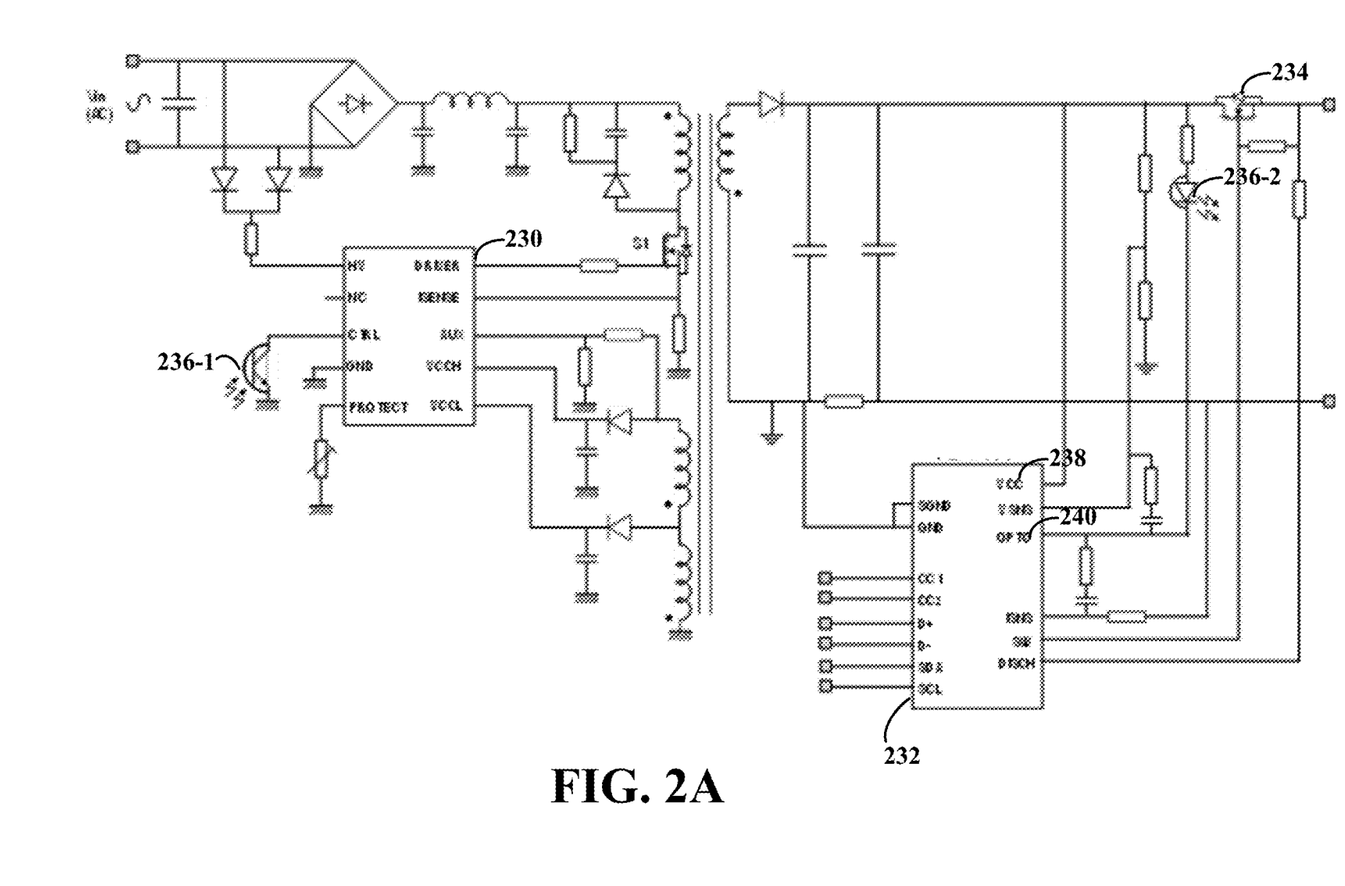
FIG. 2A illustrates an example of an isolated power converter, in accordance with the present disclosure.

FIG. 2A illustrates an example of an isolated power converter, in accordance with the present disclosure.

In various embodiments, at the primary side, a flyback converter is connected, however embodiments in accordance with the present disclosure are not so limited and a variety of different mains-isolated topology can be used. The input power on a primary side of the power converter is converted and provided as a supply voltage (Vcc) at a node on a secondary side of the power converter. At the secondary side, the secondary-side control circuitry 232 is used to provide feedback to the primary side. When supply voltage is disconnected from the secondary-side control circuitry 232 (e.g., the VCC pin 238 of the secondary-side control circuitry 232 is not connected), the secondary-side control circuitry 232 does not have power to drive the feedback. In various embodiments, an opto coupler 236-1, 236-2 is used to communicate with the primary side to provide the feedback. The primary-side control circuitry 230 can deliver power to the output without knowing the output voltage required by the load. As the primary-side control circuitry 230 delivers power to the load without being aware of when the voltage is high enough, the primary side continues to provide power until a primary over-voltage protection is triggered and the isolated power converter stops. As further described in connection with FIG. 2B, the secondary-side control circuitry 232 and the primary-side control circuitry 230 can include a number of different commercial available controllers that can be used with feedback as illustrated by the various figures herein.

As illustrated by FIG. 2A, a load switch 234 is used at the output and is turned off when the supply voltage is disconnected (e.g., VCC pin 238 is not connected). In some embodiments, the load switch 234 additionally turns off because of the resistance at the load switch 234 between gate terminal and source terminal, when there is no internal supply to turn off the load switch 234. In general, this resistor can be high ohmic, because the gate voltage is generated by a charge pump. Also, a low ohmic resistor can increase the losses.

To turn off the load switch 234 faster than the resistance, circuitry (e.g., the OPTO pin corresponding to the opto coupler 236-1, 236-2 and/or the gate voltage of the load switch 234) on the secondary side draws power when the supply voltage is present. This drawn power is used to turn the load switch 234 off by the secondary-side control circuitry 232. In general, all circuitry on the secondary side are supplied power via the VCC pin 238. Because this pin is not connected, the drawn power (e.g., OPTO voltage or gate voltage) is used. This drawn power, sometimes referred to as "an additional secondary-side power", is drawn from the supply voltage and used when the supply voltage is disconnected. The circuitry that draws the power, in some embodiments, is the gate terminal of the load switch 234. In other embodiments, and an opto coupler 236-1, 236-2 draws the power via the OPTO pin 240.

As illustrated, the opto coupler 236-1, 236-2 is coupled to the primary side (e.g., a portion 236-1) and the secondary side (e.g., another portion 236-2) and used to provide feedback to the primary side, such as for basic power control. In specific embodiments, the portion 236-2 of the opto coupler 236-1, 236-2 coupled to the secondary-side control circuitry 232 is or includes a diode that emits light based on a current applied thereto. Another portion 236-1 of the opto coupler 236-1, 236-2 that is coupled to the primary-side control circuitry 230 is or includes a transistor that is photo-sensitive and detects light from the diode (e.g., as the control signal for basic power control and/or other feedback). For example, a bright light can indicate maximum voltage is measured (e.g., decrease power) and less bright light can indicate output power is fine and/or that the power is too low (e.g., increase power).

Figure 2B:
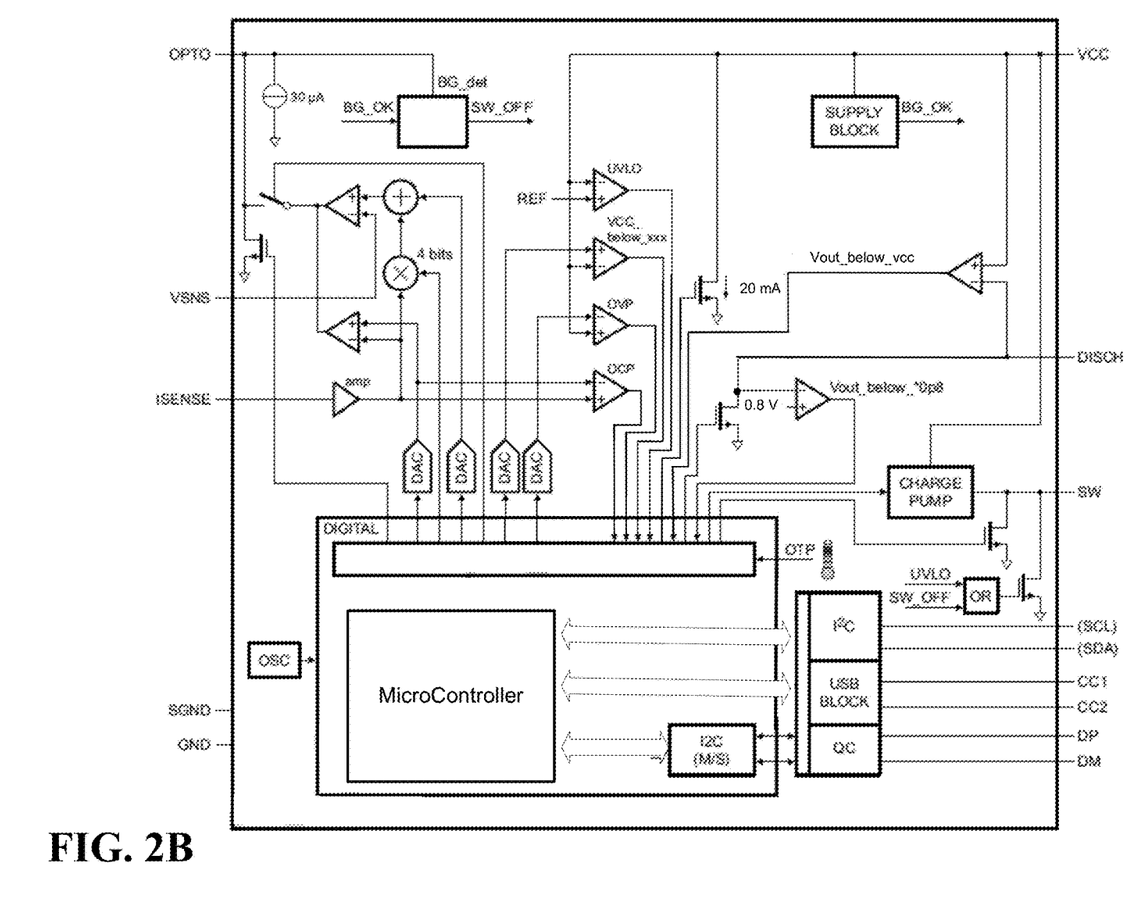
FIG. 2B illustrates an example of a secondary-side control circuitry, in accordance with the present disclosure.

As previously described, the primary-side and secondary-side control circuitries can be implemented using a number of different commercially available controllers. Examples of commercially available primary-side control circuitry include a TEA1836T GreenChip Switching Mode Power Supply (SMPS) primary side control integrated circuity and a TEA1936T GreenChip SMPS primary side control integrated circuity, both available from NXP Semiconductors N.V. FIG. 2B illustrates an example of a secondary-side control circuitry, in accordance with the present disclosure, such as a commercially available secondary-control circuitry which is a Universal Serial Bus (USB)-power delivery (USB-PD) type-C controller. However, embodiments are not so limited and can include a variety of different commercially available controllers that provide feedback from the secondary side to the primary side as described herein.

In various specific embodiments, the secondary-side control circuitry, such as the control circuitry illustrated by FIG. 2B, is a USB-PD type-C and other protocols controller with a high integration level and near fully digital bare minimum of external components. The secondary-side control circuitry can drive an N-Type metal-oxide-semiconductor field-effect switch (NMOS) load switch and can achieve high power density SMPS with efficiency over a load range. When applied in combination with a primary-side control circuitry, example secondary-side control circuitry can meet CoC Tier-2, EuP lot 6, DOE v6 energy efficiency requirement specification. In addition, the secondary-side control circuitry can incorporate the full set of type C USB-PD protocols that are used for an AC-to-DC SMPS adapter. Example protocol support includes USB-PD type-C compliance for BMC communication, other proprietary protocol support (e.g., Quick charge 3.0), CV and CC control (4-level programmable), wide VCC operation range (e.g., 3.2V to 20V), SW pin to drive external isolation N-MOSFET directly, and a combination thereof.

As illustrated by FIG. 2B, the secondary-side control circuitry can include a microcontroller that includes memory and address/data control circuitry. An opto coupler is coupled to the secondary-side control circuitry via an OPTO pin. As previously described, the secondary-side control circuitry uses the opto coupler to provide feedback to the primary side. For example, the secondary-side control circuitry drives the opto coupler with a current (that is changed) using the OPTO pin. The current changes the signal of the opto coupler (e.g., the optical signal of a diode of the opto coupler), which is sensed by a transistor of the opto coupler that is coupled to the primary-side control circuitry (and used to change the converter power).

In some specific embodiments, the switch pin (SW pin) of the secondary-side control circuitry can be used to drive an external load switch (NMOS), which enables or disables the output power over Vbus. When the output voltage is reduced or the type-C cable is detached, the discharge pin (DISCH pin) of the secondary-side control circuitry can allow for the output voltage to discharge in a controlled manner to the voltage level required by the USB-PD protocol. Further, the gate voltage can be generated by the charge pump of the secondary-side control circuitry.

In other related-specific embodiments, the secondary-side control circuitry can provide various protections, such as OverTemperature Protection (OTP), adaptive OverVoltage Protection (OVP), Short Circuit Protection (SCP), and/or UnderVoltage LockOut (UVLO) protection. Other example protections include OverCurrent Protection (OCP), open ground protection, Vcc to SW short protection, open Vcc detection, and CC1/CC2 to Vout short protection.

The secondary-side control circuitry can include various other pins, in some related-specific embodiments. As previously described, the DISCH pin of the secondary-side control circuitry can be used to discharge the output voltage in a controlled manner to the voltage level required by the USB-PD protocol. The VCC pin is used to power the secondary-side control circuitry. In various embodiments, in response to a sudden disconnect of VCC, another voltage source is used (e.g., the gate voltage of the load switch via the SW pin or a voltage on the OPTO pin). As previously described, the external load switch is controlled by the secondary-side control circuitry. The pins SCL (e.g., I2C bus serial clock input/output) and SDA (e.g., I2C bus serial data input/output), as one of skill in the art would appreciate, are conventional pins to Inter-Integrated Circuit (I2C) (e.g., the I2C block). Further, the pins CC1 (e.g., a type C CC1 line detection), CC2 (e.g., a type C CC2 line detection), DP (e.g., USB DP input) and DM (e.g., USB DM input), as one of skill in the art would appreciate, are conventional pins to USB (e.g., the USB block). The CC2 and CC2 pins can be used for plug attach/detach detection. The DP and DM pins can be used for quality control (e.g., the QC block to the USB I2C Adapter (master/slave)). For example, the DP and DM pins can be used to support proprietary protocols and the Battery Charger 1.2 specification. The SGND pin includes a sense ground pin and GND includes a ground pin, as may be appreciated by one of skill in the art.

In a number of specific-embodiments, the secondary-side control circuitry can monitor for various fault conditions. For example, the VSNS pin of an example secondary-side control circuitry is used to sense input voltage (e.g., supply voltage at a node that is indicative of voltage input to the load switch). The ISENSE pin of the secondary-side control circuitry can be used to sense input current (e.g., current at a node that is indicative of current input to the load switch). For example, the ISENSE pin can be used for CC mode, cable compensation, and OCP. A fault condition of the load switch, as previously described, can be monitored by the voltage difference between VCC and the output voltage (e.g., via the DISCH pin and/or capacitance on the DISCH pin in combination with an external current limiting resistor).

In various-specific embodiments, the primary-side control circuitry can be used for switched mode power supplies. For example, the primary-side control circuitry used can be beneficial in flyback topologies to be used either standalone or together with USB-PD controllers, such as illustrated by FIG. 2B, at the secondary side. The built-in green functions provide efficiency at all power levels. The primary-side control circuitry can be compatible with multiple output voltage applications over a wide output range from 5V to 20V in Constant Voltage (CV) mode, when used with a USB-PD secondary side controller. The in a number of specific embodiments, the primary-side control circuitry and the secondary-side control circuitry also support Constant Current (CC) mode operation down to 3V.

In specific embodiments, at high power levels, the primary-side control circuitry operates in Quasi-Resonant (QR) mode. At lower power levels, the primary-side control circuitry switches to Frequency Reduction (FR) or Discontinuous Conduction Mode (DCM) and limits the peak current to a minimum level. Valley switching is used in all operating modes.

At low power levels, the primary-side control circuitry can uses burst mode to regulate the output power. A special opto current reduction regulation has been integrated which reduces the average opto current in all modes to a minimum level. This reduction ensures efficiency at low power and excellent no-load power performance. As the switching frequency in this mode is greater than 25 kHz and the burst repetition rate is regulated to a low value, the audible noise is minimized. During the non-switching phase of the burst mode, the internal IC supply current is minimized for further efficiency optimization.

The primary-side control circuitry can include an accurate OverPower Protection (OPP). If the output is shorted, the system switches to low-power mode. The output current is then limited to a lower level. Example primary-side control circuitry can enable low-cost, efficient and reliable supplies including multiple output voltage support for power requirements up to 75 W using a minimum number of external components.

In a number of specific embodiments, features of the primary-side control circuitry can include SMPS controller IC supporting multiple-output-voltage applications, wide output range (5V to 20V in CV mode and 3V to 20V in CC mode), and/or adaptive dual supply for efficiency over the entire output voltage range. Alternatively and/or in addition, by using a primary-side control circuitry in accordance with various embodiments, integrated high-voltage start-up and X-capacitor discharge, continuous Vcc regulation during start-up and protection via the HV pin, and integrated soft start can be achieved. Other general features can include allowing a minimum Vcc capacitor value, reduced opto current enabling low no-load power (20 mW at 5V output), and fast transient response from 0 to full load. Further, the primary-side control circuitry can provide low supply current during normal operation (e.g., 0.6 mA without load) and low supply current during non-switching state in burst mode (e.g., 0.2 mA).

In related specific embodiments, protection features of the primary-side control circuitry can include mains voltage compensated OverPower Protection (OPP), OverTemperature Protection (OTP), integrated overpower time-out, and integrated restart timer for system fault conditions. Additional protection features can include accurate OverVoltage Protection (OVP), general-purpose input for safe restart protection; for use with system OverTemperature Protection (OTP), driver maximum on-time protection, and brown-in and brown-out protection.

Figure 3:
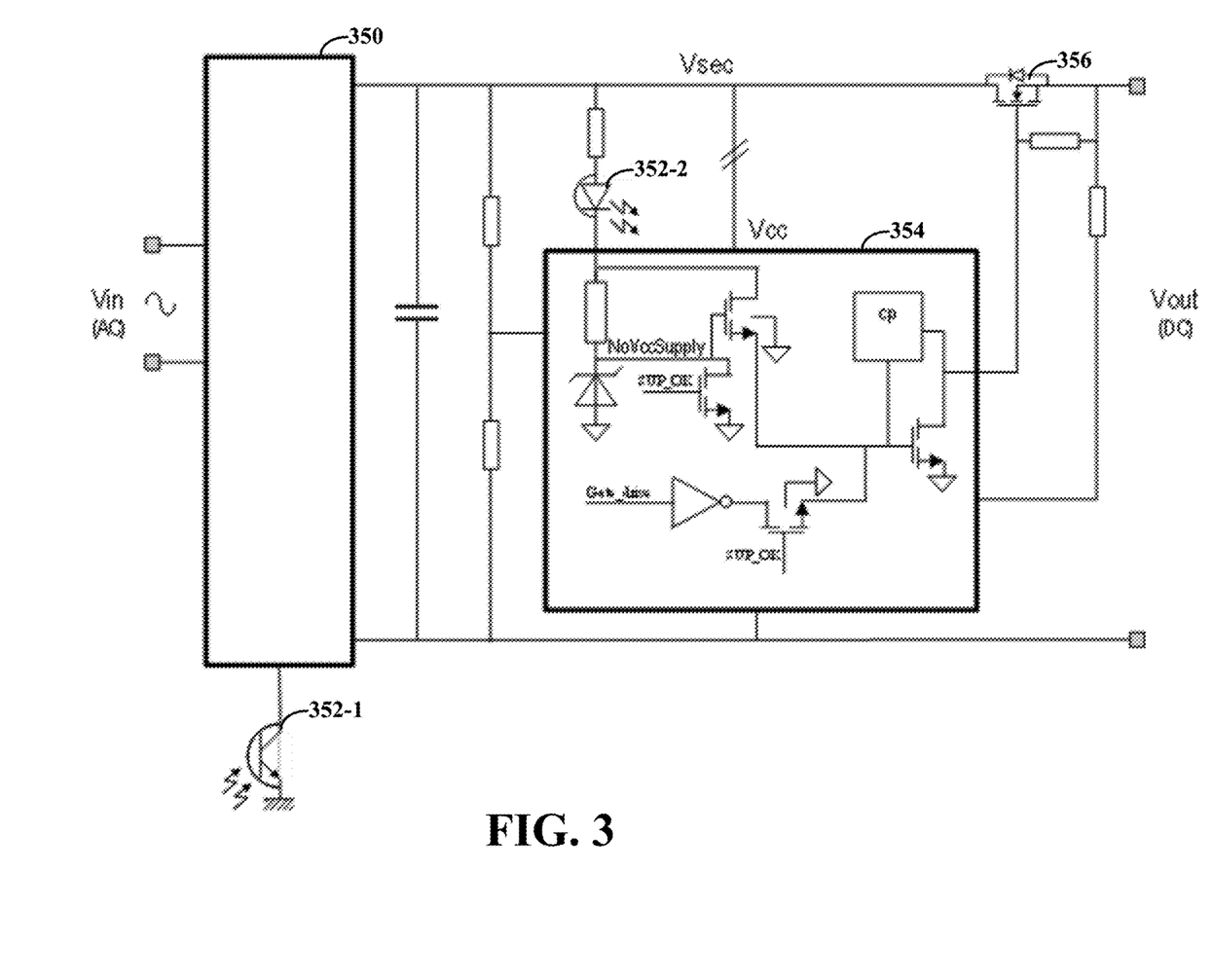
FIG. 3 illustrates an example of an isolated power converter, in accordance with the present disclosure.

FIG. 3 illustrates an example of an isolated power converter, in accordance with the present disclosure. More particularly, FIG. 3 illustrates secondary side of the isolated power converter turning off the load switch 356 when the supply voltage is disconnected (e.g., Vcc pin is not connected).

Normally the gate terminal of the load switch 356 can be driven via the Gate_drive signal. When this signal is high, the gate terminal of the load switch 356 is driven to a gate voltage (e.g., forced high). When the Vcc is disconnected, the secondary-side control circuitry 354 does not have supply power. In various embodiments, another signal (e.g., a SUP_OK signal), can be high when there is internal supply. As soon as the internal supply falls away (SUP_OK=0), the path which is supplied from the opto pin generates a signal (e.g., NoVccSupply). The signal is provided by the secondary-side control circuitry 354 to turn the load switch 356 off (e.g., the gate terminal of the load switch 356 is pulled down using another supply voltage at the secondary side). In such embodiments, a voltage at the opto pin is drawn when supply voltage is present and used to turn off the load switch 356. The output voltage to the load is then zero and the primary side 350 continues to deliver power until the primary over-voltage protection is triggered due to no feedback from the secondary side and the converter stops (e.g., the system tries to regulated Vsec voltage but because of no supply voltage to provide feedback, the primary over-voltage protection is triggered). The primary over-voltage protection is triggered, in various embodiments, via the primary-side monitoring transformer voltage.

The circuitry (e.g., opto coupler 352-1, 352-2) is used to provide basic power control and to respond to fault conditions on the secondary side. In some embodiments, the circuitry provides feedback only. For example, a control signal is triggered via circuitry on the secondary side and output to the primary-side control circuitry in response to a fault condition in which supply voltage is present or to provide feedback in response to feedback from the load (e.g., a change in the setpoint voltage value). The control signal is provided by an opto coupler 352-1, 352-2. The opto coupler 352-1, 352-2 is powered via the secondary-side voltage (Vsec). However, embodiments are not so limited. In some embodiments, the control signal is provided to the primary side 350 via other mechanisms, such as a pulse transformer of the main transformer.

In the TEA1905, the mechanism is slightly different, but the SUP_OK signal can be used to pull down the gate terminal of the load switch 356. The opto voltage is used as supply voltage.

Figure 4:
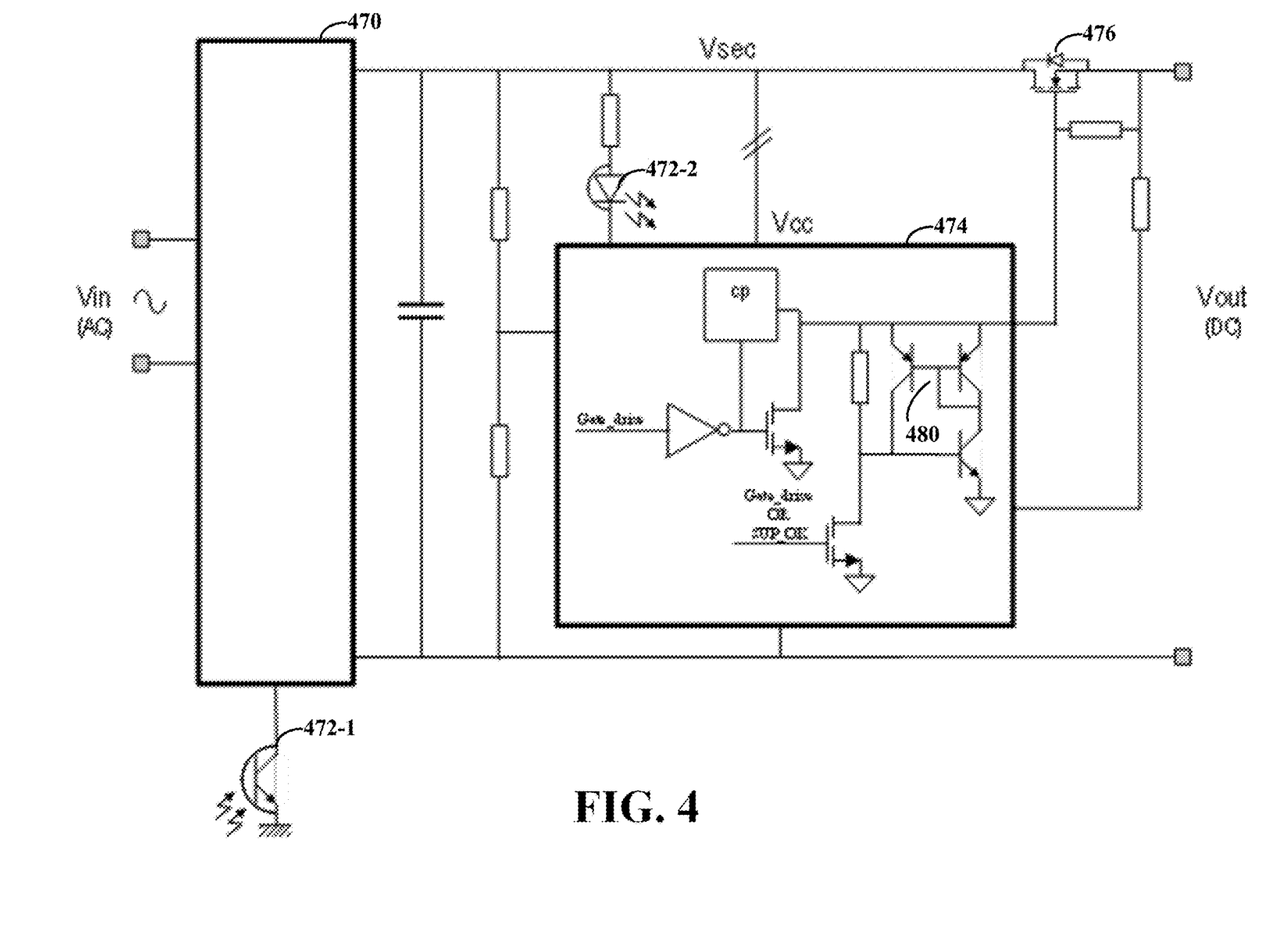
FIG. 4 illustrates an example of an isolated power converter, in accordance with the present disclosure.

FIG. 4 illustrates an example of an isolated power converter, in accordance with the present disclosure. In various embodiments, the gate voltage of the load switch 476 itself is used to turn off the gate terminal of the load switch 476 when no supply voltage is connected. In FIG. 4, the principle schematic of the turn off circuit is illustrated. The load switch 476 and other circuitry illustrated by FIG. 4 are bipolar transistors. However, various other circuitry can be used. For example, these bipolar transistors can be replaced by MOS. In various embodiments, the gate voltage of the load switch 476 is used to provide another voltage source on the secondary side when a mechanism other than using an opto coupler 472-1, 472-2 is used to provide feedback or when the voltage at the opto pin is not used to provide another voltage source.

When the NMOS on the bottom is not driven, then via the resistor 480, the latch is activated and pulls down the gate terminal of the load switch 476. This can happen when the Vcc pin is disconnected in a running application or during start-up. The gate terminal of this MOS can be connected to SUP_OK. In this case, the load switch 476 is discharged when there is no supply voltage. The gate terminal can also be driven by the Gate_drive signal. In this case, the Gate_drive signal goes to zero when there is no internal supply. For example, when the gate_drive signal is used, the thyristor circuit helps to turn off the load switch 476, and also when there is supply voltage present.

The activation resistor 480 can also be replaced by 1 or more MOS transistors. In various embodiments, the resistor 480 is a thryristor circuit coupled to the gate terminal of the load switch 476. The thryristor circuit can respond to an indication of the fault condition by latching and causing the load switch 476 to be maintained in the OFF mode.

Responsive to the fault condition in which supply voltage is connected and/or a basic power control, a control signal is triggered via circuitry on the secondary side and output to the primary-side control circuitry on the primary side 470 to provide feedback to the secondary side. The control signal (e.g., a power control signal) is provided by an opto coupler 472-1, 472-2, in various embodiments. The opto coupler 472-1, 472-2 is powered via the secondary-side voltage (Vsec). In other embodiments, a pulse transformer of the main transformer is used to provide the feedback.

In some embodiments, the secondary-side control circuitry 474 is effectively and/or suddenly disconnected from supply power (e.g., Vsec/Vcc). An additional voltage supply can be present on the secondary side. For example, an additional secondary-side voltage is drawn from the supply voltage using the gate terminal of the load switch 476 and used to power the secondary-side control circuitry 474 to switch the load switch 476 off when the supply voltage is disconnected. Further, in some embodiments, the primary-side control circuitry, in response to the load switch being switch into the OFF mode and no feedback from the secondary side, limits the power supplied to the secondary side by triggering a primary over-voltage protection (responsive to the secondary-side voltage exceeding a threshold voltage as monitored by the primary side). However, embodiments are not so limited.

As may be appreciated, FIGS. 3 and 4 illustrated portions of a converter but do not illustrate all of the converter functionality, such as the functionality of a flyback converter. Such illustrations are provided for illustrative purposes of the over-voltage protection when the supply voltage is effectively disconnected at the secondary-side circuitry.

The isolated power converter, as illustrated and described herein, such as illustrated by FIGS. 1A and 1B, can be used to perform various methods. In various embodiments, a method includes responding to input power on a primary side of an isolated power converter by providing a supply voltage at a node on a secondary side of the isolated power converter. The supply voltage (Vcc) being one of multiple voltages that is selected based on feedback from a load to the primary-side. The supply voltage (Vcc) is received at the node and passed along a first current path from the node to the load and a second current path to secondary-side control circuitry on the secondary side. In response to the presence of the supply voltage at the secondary-side control circuitry, the method includes controlling a load switch to operate in an ON mode in which the first current path is used to provide current to the load. And, in response to a fault condition of the supply voltage corresponding to an effective sudden disconnection, in the form of a short circuit or an open circuit, the method includes switching the load switch into an OFF mode in which the current path to the load is blocked, and causing the primary-side control circuitry to limit an extent to which the isolated power converter is capable of supplying power for providing the supply voltage. For example, the load switch is opened, the voltage at Vcc rises and the feedback loop (e.g., the feedback to the primary side) is used to limit the power delivering of the primary side. However, when VCC is open, the normal feedback loop may not work and another voltage source on the secondary side is used to force the load switch into an OFF mode as quickly as possible. For example, the limited supply of power can result in the supply voltage provided to the node being zero. When the load switch is forced into the OFF mode, the Vcc voltage can be regulated, for example, to 5V. However, when no control signal is provided to the primary side due to disconnect from the supply source at the secondary-side control circuitry, the Vcc voltage may rise until the primary side detects on over-voltage. The load switch is opened prior to the primary over-voltage protection to limit voltage at the load.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

For the purposes of this document, the following terms and definitions apply: isolated power converter refers to or includes circuitry configured to deliver power to a load that includes two isolated sides; fault condition refers to or includes a disconnect of supply voltage to circuitry of the secondary side of the isolated power converter among other conditions such as an over-temperature, over current, and communication error load, among others; load switch refers to or includes circuitry that allows or blocks a current path to a load; supply voltage (Vcc) refers to or includes voltage received at a node on the secondary side from the primary side; a converter output voltage (Vout) refers to or includes a voltage provided to a load; load refers to or includes a device or component that consumes power; load circuitry refers to or includes circuitry that draws power from the apparatus; voltage drop refers to or includes a drop of voltage input to a load switch as compared to output; USB power-delivery controller circuit refers to or includes circuitry configured to negotiate power using a USB connection.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller and/or other circuit-type depictions (e.g., reference numerals 106 and 238/230 of FIGS. 1A, 1B, and 2 depict a block/module as described herein). Such circuits or circuitry are used together with other elements to exemplify how certain embodiments may be carried out in the form or structures, steps, functions, operations, activities, etc. For example, in certain of the above-discussed embodiments, one or more illustrated items in this context represent circuits (e.g., discrete logic circuitry or (semi-)programmable circuits) configured and arranged for implementing these operations/activities, as may be carried out in the approaches shown in FIGS. 3 and 4. In certain embodiments, such illustrated items represent one or more computer circuitry (e.g., microcomputer or other CPU) which is understood to include memory circuitry that stores code (program to be executed as a set/sets of instructions) for performing a basic algorithm (e.g., receive Vcc and Vout, control the load switch, activate circuitry in response to a fault condition) or the more complex process/algorithm as described at FIGS. 3 and 4 to perform the related steps, functions, operations, activities, etc. The specification may also make reference to an adjective that does not connote any attribute of the structure ("a first opto coupler" and "second opto coupler" in which case the adjective is merely used for English-language antecedence to differentiate one such similarly-named structure from another similarly-named structure (e.g., "a first opto coupler . . . " is interpreted as "opto coupler"). On the other hand, specification may make reference to an adjective that is intended to connote an attribute of the structure (e.g., primary-side control circuitry), in which case the adjective (e.g., control) refers to at least a portion of the named structure (e.g., circuitry) is configured to have/perform that attribute (e.g., control circuitry refers to at least a portion of a circuitry that includes/performs the attribute of controlling).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, an isolated power converter can draw secondary side power during an ON mode of the load switch to turn the load switch off in response to a fault condition and provide feedback to the primary side. Such modifications do not depart from the true spirit and scope of various aspects of the disclosure, including aspects set forth in the claims.

What is claimed is:

1. An apparatus for delivering power to a load having load circuitry configured to draw power from the apparatus, the apparatus comprising:
    an isolated power converter configured and arranged to convert input power at a primary side of the isolated power converter to output power and a supply voltage at a node on a secondary side of the isolated power converter;

on the primary side of the isolated power converter, primary-side control circuitry configured and arranged to limit an extent to which the isolated power converter is capable of supplying power for providing the supply voltage at an output;

on the secondary side of the isolated power converter, a load switch configured and arranged along a current path between the node and the load having load circuitry configured to draw power from the apparatus; and on the secondary side of the isolated power converter, secondary-side control circuitry configured and arranged to receive the supply voltage and to control the load switch to operate in an ON mode in which the current path is used to provide current to the load, and in response to a fault condition corresponding to an effective sudden disconnection of the supply voltage, switches the load switch into an OFF mode in which the current path to the load is blocked using an alternative source of power.

2. The apparatus of claim 1, wherein the secondary side of the isolated power converter further includes circuitry configured and arranged to draw power during the ON mode, and in response to the fault condition in which the supply voltage is absent and the load switch is switched into the OFF mode using the drawn power, the secondary side is configured and arranged to cause the primary-side control circuitry to limit an extent to which the isolated power converter is capable of supplying power using the drawn power as the alternative source of power.

3. The apparatus of claim 1, wherein the secondary side of the isolated power converter further includes an opto coupler configured and arranged to draw power and charge another node as the alternative source of power, and in response to the fault condition in which the supply voltage is absent, the secondary-side control circuitry is configured and arranged to switch the load switch into the OFF mode using the drawn power.

4. The apparatus of claim 1, wherein the secondary side of the isolated power converter further includes an opto coupler configured and arranged to operate in an activated state during the OFF mode and ON mode, and the opto coupler is further configured and arranged to respond to a logic signal indicative of the fault condition by changing to a state through which the secondary-side control circuitry is configured and arranged to switch the load switch to the OFF mode and cause the primary-side control circuitry to limit the extent to which the isolated power converter is capable of supplying power.

5. The apparatus of claim 1, wherein the secondary side of the isolated power converter further includes a charged node that is charged during the ON mode, wherein the charged node includes an opto pin of the secondary-side control circuitry, and wherein the secondary-side control circuitry is configured and arranged to, in response to an indication of the fault condition, cause the load switch to operate in the OFF mode using drawn power from the charged node as the alternative source of power.

6. The apparatus of claim 1, wherein the secondary side of the isolated power converter further includes a charged node that is charged during the ON mode, wherein the charged node includes a gate terminal of the load switch, and wherein in response to an indication of the fault condition, the secondary-side control circuitry is configured and arranged to cause the load switch to operate in the OFF mode using drawn power from the charged node as the alternative source of power.

7. The apparatus of claim 1, further including a thryristor circuit coupled to a gate terminal of the load switch, wherein the thryristor circuit is configured and arranged to respond to an indication of the fault condition by latching and causing the load switch to be maintained in the OFF mode.

8. The apparatus of claim 1, wherein the isolated power converter is further configured and arranged to respond to input power on the primary side of the isolated power converter by providing the supply voltage from which another node draws an additional secondary-side voltage from, and wherein the secondary-side control circuitry is configured and arranged to draw power from the additional secondary-side voltage in the absence of supply voltage and as the alternative source of power.

9. The apparatus of claim 1, wherein the primary-side control circuitry has an over-voltage protection circuit configured and arranged to trigger a primary over-voltage protection in response to the load switch being switched into the OFF mode and no feedback from the secondary side by monitoring secondary-side voltage and limiting an extent to which the isolated power converter is capable of supplying power in response to a secondary-side voltage exceeding a threshold voltage.

10. The apparatus of claim 1, wherein the secondary-side control circuitry is part of a USB power-delivery controller circuit that includes an opto coupler configured and arranged to operate in an activated state during the ON mode and OFF mode and to respond to the USB power-delivery controller circuit.

11. The apparatus of claim 1, wherein the secondary side includes an opto coupler configured and arranged to charge an opto pin when the supply voltage is connected, wherein the opto coupler is part of a USB power-delivery controller circuit, and wherein the USB power-delivery controller circuit, located on the secondary side, is configured and arranged to control the opto coupler and thereby cause the load switch to switch into the OFF mode in response to the fault condition by drawing power from the opto pin as the alternative source of power.

12. The apparatus of claim 1, wherein the secondary side of the isolated power converter further includes logic circuitry configured and arranged to sense a disconnection or short between terminals providing the supply voltage and the load circuit.

13. The apparatus of claim 1, wherein the primary-side control circuitry is part of power-delivery controller circuit that receives a control signal from the secondary side responsive to feedback from the load, and wherein the isolated power converter is further configured and arranged to provide the supply voltage as one of multiple voltages that is selected based on feedback from the load to the secondary-side control circuitry.

14. The apparatus of claim 1, wherein the primary-side control circuitry has over-voltage protection circuit and is further configured and arranged to control an extent to which the isolated power converter is capable of supplying power by monitoring secondary-side voltage and triggering a primary over-voltage protection in response to the secondary-side voltage reaching a threshold voltage, and the secondary-side control circuitry is configured and arranged to control an extent to which the isolated power converter is capable of outputting power by switching the load switch into the OFF mode to limit the output power at a voltage that is lower than the threshold voltage.

15. An apparatus for delivering power to a load having load circuitry configured to draw power from the apparatus, the apparatus comprising:
- an isolated power converter configured and arranged to convert input power on a primary side of the isolated power converter to output power and a supply voltage at a node on a secondary side of the isolated power converter;
- on the primary side of the isolated power converter, a primary-side control circuitry configured and arranged to limit an extent to which the isolated power converter is capable of supplying power for providing the supply voltage;
- on the secondary side of the isolated power converter, a load switch configured and arranged along a current path between the node and the load having load circuitry configured to draw power from the apparatus; and
- on the secondary side of the isolated power converter,
  - circuitry configured and arranged to draw power during an ON mode, and
  - a USB power-delivery controller circuit configured and arranged to receive the supply voltage and to control the load switch to operate in the ON mode in which the current path is used to provide current to the load, and in response to a fault condition of the supply voltage corresponding to an effective sudden disconnection, in the form of a short circuit or an open circuit, switches the load switch into an OFF mode in which the current path to the load is blocked using the power drawn by the circuitry.

16. The apparatus of claim 15, the secondary side further including an other node, wherein the circuitry is configured and arranged to draw power during the ON mode to charge the other node on the secondary side, and in response to the fault condition in which the supply voltage is absent, configured and arranged to cause the USB power-delivery controller circuit on the secondary to limit an extent to which the isolated power converter is capable of supplying outputting power by drawing power from the other node and switching the load switch into the OFF mode using the drawn power.

17. The apparatus of claim 15, wherein the circuitry includes a gate terminal of the load switch, wherein the USB power-delivery controller circuit is configured and arranged to provide a gate voltage to the gate terminal during the ON mode and in response to the fault condition in which the supply voltage is absent, the USB power-delivery controller circuit is configured and arranged to switch the load switch into the OFF mode in using the gate voltage at the load switch.

18. The apparatus of claim 15, wherein the isolated power converter is further configured and arranged to provide the supply voltage as one of multiple voltages that is selected based on feedback from the load to the USB power-delivery controller circuit, and wherein the USB power-delivery controller circuit is configured and arranged to, responsive to an indication of the fault condition, and switch the load switch into the OFF mode to limit the extent to which the isolated power converter supplies power regardless of which one of multiple voltages that is selected.

19. A method comprising:
- converting input power on a primary side of an isolated power converter to output power and a supply voltage at a node on a secondary side of the isolated power converter, wherein the supply voltage is one of multiple voltages that is selected based on feedback from a load to the secondary side;
- receiving the supply voltage at the node and passing the supply voltage along a current path from the node to the load;
- in response to a presence of the supply voltage at a secondary-side control circuitry, controlling a load switch to operate in an ON mode in which the current path is used to provide current to the load; and
- in response to a fault condition of the supply voltage corresponding to an effective sudden disconnection, in a form of a short circuit or an open circuit,
  - switching the load switch into an OFF mode in which the current path to the load is blocked, and
  - causing a primary-side control circuitry to limit an extent to which the isolated power converter is capable of supplying power for providing the supply voltage in response to the load switch switching into the OFF mode.

20. The method of claim 19, further including measuring supply voltage at the secondary side and limiting the supply of power for providing the supply voltage to the node on the secondary side in response to the supply voltage exceeding a threshold voltage, such that the supply voltage provided to the node is zero.

* * * * *